(12) United States Patent
Mori

(10) Patent No.: US 9,554,034 B2
(45) Date of Patent: Jan. 24, 2017

(54) LENS DEVICE

(71) Applicant: FUJIFILM Corporation, Tokyo (JP)

(72) Inventor: Yoshitaka Mori, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/959,906

(22) Filed: Dec. 4, 2015

(65) Prior Publication Data

US 2016/0088217 A1 Mar. 24, 2016

Related U.S. Application Data

(63) Continuation of application No. PCT/JP2014/063774, filed on May 26, 2014.

(30) Foreign Application Priority Data

Jun. 5, 2013 (JP) .................................. 2013-118494

(51) Int. Cl.
*H04N 5/232* (2006.01)
*G03B 13/36* (2006.01)
(Continued)

(52) U.S. Cl.
CPC ............ *H04N 5/23212* (2013.01); *G02B 7/09* (2013.01); *G02B 7/282* (2013.01); *G02B 7/343* (2013.01);
(Continued)

(58) Field of Classification Search
CPC .................. H04N 5/23212; G02B 7/00–7/105; G03B 13/00–13/12; G03B 13/20; G03B 13/36
(Continued)

(56) References Cited

U.S. PATENT DOCUMENTS 4,492,449 A 1/1985 Oinoue et al.
5,597,999 A 1/1997 Kinba et al.
(Continued)

FOREIGN PATENT DOCUMENTS

JP 58-211721 A 12/1983
JP 61-295523 A 12/1986
(Continued)

OTHER PUBLICATIONS

International Search Report issued in PCT/JP2014/063774, dated Aug. 5, 2014.
(Continued)

*Primary Examiner* — Lin Ye
*Assistant Examiner* — Chriss Yoder, III
(74) *Attorney, Agent, or Firm* — Birch, Stewart, Kolasch & Birch, LLP

(57) ABSTRACT

The purpose of the present invention is to reduce the size of an image pick-up lens unit. A part of a bundle of rays representing subject optical images is deflected vertically downward by a polarization prism, and is further deflected forwards by a total reflection mirror. A bundle of rays totally reflected by the total reflection mirror is split in three directions by a tri-directional splitting prism. The bundle of rays, which is split in three directions, is incident on a first optical-path-length-difference image pick-up element, a second optical-path-length-difference image pick-up element, and a phase-difference image pick-up element included in a phase-difference AF optical system. Auto focus (AF) is performed on the basis of the optical path length difference from signals obtained from the optical-path-length-difference image pick-up elements, and AF is performed on the basis of the phase difference from a signal obtained from the phase-difference image pick-up element. Since the phase-difference AF optical system is disposed so as to be parallel (Continued)

to the axis of the light forming the subject optical images, the size of the image pick-up lens unit can be reduced.

4 Claims, 11 Drawing Sheets

(51) Int. Cl.
G02B 7/28 (2006.01)
G02B 7/34 (2006.01)
G03B 33/12 (2006.01)
H04N 5/225 (2006.01)
G02B 7/09 (2006.01)
G02B 27/12 (2006.01)
G02B 27/16 (2006.01)
G02B 7/36 (2006.01)
G02B 7/38 (2006.01)

(52) U.S. Cl.
CPC ............ *G02B 27/123* (2013.01); *G02B 27/16* (2013.01); *G03B 13/36* (2013.01); *G03B 33/12* (2013.01); *H04N 5/2253* (2013.01); *H04N 5/2254* (2013.01); *G02B 7/36* (2013.01); *G02B 7/38* (2013.01); *G03B 2217/002* (2013.01)

(58) Field of Classification Search
USPC ........ 348/345–357; 359/696, 698; 250/201.6
See application file for complete search history.

(56) References Cited

U.S. PATENT DOCUMENTS

| | | | |
|---|---|---|---|
| 6,363,220 | B1 | 3/2002 | Ide |
| 7,006,140 | B2* | 2/2006 | Shono ................ H04N 5/2251 348/344 |
| 7,209,175 | B1 | 4/2007 | Kurokawa et al. |
| 2001/0023917 | A1 | 9/2001 | Kinba et al. |
| 2012/0087544 | A1* | 4/2012 | Muramatsu ............ G03B 15/16 382/103 |

FOREIGN PATENT DOCUMENTS

| | | |
|---|---|---|
| JP | 7-43605 A | 2/1995 |
| JP | 9-274130 A | 10/1997 |
| JP | 2000-266988 A | 9/2000 |
| JP | 2001-264625 A | 9/2001 |
| JP | 2004-117491 A | 4/2004 |

OTHER PUBLICATIONS

Written Opinion of the International Searching Authority issued in PCT/JP2014/063774, dated Aug. 5, 2014.

* cited by examiner

LENS DEVICE

CROSS-REFERENCE TO RELATED APPLICATIONS

This application is a Continuation of PCT International Application No. PCT/JP2014/063774 filed on May 26, 2014, which claims priority under 35 U.S.C. §119(a) to Japanese Patent Application No. 2013-118494 filed Jun. 5, 2013. Each of the above application(s) is hereby expressly incorporated by reference, in its entirety, into the present application.

BACKGROUND OF THE INVENTION

1. Field of the Invention

The present invention relates to a lens device.

2. Description of the Related Art

There are phase-difference AF (autofocus), contrast AF, and the like as the autofocus of a camera. In phase-difference AF, light entering from a lens is split into two or three or more light components by pupil splitting and is led to a phase-difference AF sensor, and a focusing direction and a focus-shift amount are determined on the basis of a position-shift direction and a position-shift amount of each pupil-split image in a pupil-split direction. As the contrast AF, there are a method of performing focusing by detecting a position where contrast is large while moving a focus lens on the basis of an image taken by an image pick-up element, and a method of picking up the image of a subject by two image pick-up elements disposed at positions having different optical path lengths and performing focusing on the basis of image signals obtained from the respective image pick-up elements (optical-path-length-difference AF). There is also a case in which optical-path-length-difference AF and phase-difference AF are used together (JP07-43605A).

SUMMARY OF THE INVENTION

Since light entering from a lens is split into two light components by pupil splitting and is led to the phase-difference AF sensor, and a focusing direction and a focus-shift amount are determined on the basis of a position-shift direction and a position-shift amount of each pupil-split image in a pupil-split direction in phase-difference AF, an optical system is long. When a lens device is adapted so that phase-difference AF and contrast AF can be used, the lens device may have a large size or have a shape that is hard to handle if a disposition for the optical system is not planned. The disposition of an AF optical system and the like in a lens device is not described and the above-mentioned problem is not considered in JP07-43605A.

An object of the invention is to prevent a lens device from increasing in size.

A lens device according to the invention includes: a subject image pick-up optical system that allows a bundle of rays, which represents subject optical images, to form images on a light-receiving surface of a subject image pick-up element; a phase-difference AF optical system that includes a phase-difference image pick-up element in which a plurality of subject optical images, which are obtained when an incident bundle of rays having an optical axis parallel to an optical axis of the subject image pick-up optical system is split into a plurality of light components by pupil splitting, are formed on a light-receiving surface of the phase-difference image pick-up element; an optical-path-length-difference AF optical system that includes a first image pick-up element and a second image pick-up element disposed at positions having different optical path lengths on an optical path of a bundle of rays incident on the subject image pick-up optical system; and a light branching optical system that leads a part of a bundle of rays, which is led to the subject image pick-up element by the subject image pick-up optical system, to the phase-difference AF optical system and the optical-path-length-difference AF optical system.

According to the invention, the subject image pick-up optical system allows a bundle of rays, which represents subject optical images, to form images on the light-receiving surface of the subject image pick-up element. The phase-difference AF optical system includes the phase-difference image pick-up element in which a plurality of subject optical images, which are obtained when an incident bundle of rays having an optical axis parallel to an optical axis of the subject image pick-up optical system is split into a plurality of light components by pupil splitting, are formed on the light-receiving surface of the phase-difference image pick-up element. Further, the optical-path-length-difference AF optical system includes the first image pick-up element and the second image pick-up element that are disposed at positions having different optical path lengths on an optical path of a bundle of rays incident on the subject image pick-up optical system. A part of a bundle of rays, which is led to the subject image pick-up element, is led to the phase-difference AF optical system and the optical-path-length-difference AF optical system by the subject image pick-up optical system. Since the optical axis of the phase-difference AF optical system is parallel to the optical axis of the subject image pick-up optical system, the length of the phase-difference AF optical system extends in the longitudinal direction of the lens device. It is possible to suppress an increase in the size of the lens device even though the phase-difference AF optical system is long.

It is preferable that the phase-difference AF optical system is disposed below the subject image pick-up optical system (below the subject image pick-up optical system in a vertical direction in a posture state at an initial position (reference position) where the lens device does not tilt, roll, and the like). Further, the phase-difference AF optical system includes a pupil-splitting optical element that pupil-splits an incident bundle of rays, and the pupil-splitting optical element is rotatable about an optical axis of the phase-difference AF optical system.

For example, the light branching optical system includes: a light branching unit that branches a part of the bundle of rays, which is led to the subject image pick-up element by the subject image pick-up optical system, in a vertical direction; and an optical path changer that branches the bundle of rays, which is branched by the light branching unit, to the front of the lens device (the side of the lens device facing the subject is the front side, and the side of the lens device facing an image is the rear side). Further, the optical-path-length-difference AF optical system includes a tri-directional light branching unit that transmits a part of the bundle of rays, which is led to the front of the lens device by the optical path changer, and branches the bundle of rays in two directions different from a direction toward the front of the lens device, and leads two pencils of light, which are branched in two directions different from the direction toward the front of the lens device by the tri-directional light branching unit, to the first image pick-up element and the second image pick-up element. The bundle of rays, which is transmitted through the tri-directional light branching unit, is incident on the phase-difference AF optical system.

It is possible to suppress an increase in the size of the lens device even though the phase-difference AF optical system is long.

DESCRIPTION OF THE PREFERRED EMBODIMENTS

Figure 1:
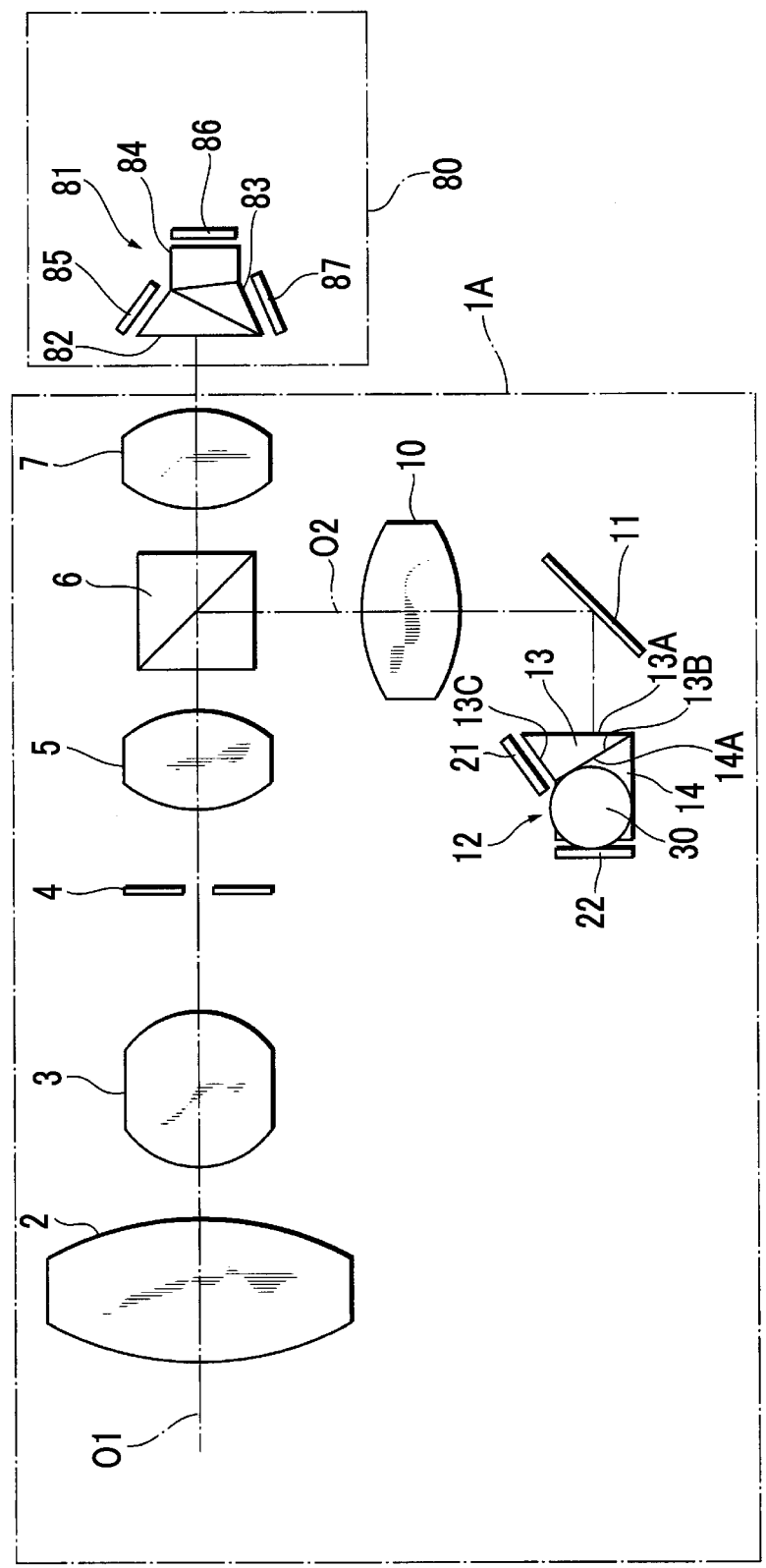
FIG. 1 shows the structure of an imaging lens unit.

FIG. 1 is a view showing an embodiment of the invention, and shows the optical structure of an imaging lens unit 1A and a part of a camera body 80 that are used for a broadcast or the like.

The imaging lens unit 1A is detachably mounted on the camera body 80.

A focus lens (focus lens group) 2, a zoom lens (zoom lens group) 3, a front relay lens (front relay lens group) 5, and a rear relay lens (rear relay lens group) 7 are included in the imaging lens unit 1A so as to have the same optical axis as an optical axis O1 of the imaging lens unit 1A. A diaphragm 4 is disposed between the zoom lens 3 and the front relay lens 5 so that the optical axis O1 of the imaging lens unit 1A passes through the center of the diaphragm. Further, a polarizing prism 6 is disposed between the front relay lens 5 and the rear relay lens 7. The focus lens 2, the zoom lens 3, the front relay lens 5, the diaphragm 4, the polarizing prism 6, and the rear relay lens 7 allow a bundle of rays, which represents subject optical images, to form images on the light-receiving surfaces of a first subject image pick-up CCD 85, a second subject image pick-up CCD 86, and a third subject image pick-up CCD 87 (subject image pick-up element) included in the camera body 80; and are called a subject image pick-up optical system.

The camera body 80 is provided with a color separating prism 81 that has the same optical axis as the optical axis O1 of the imaging lens unit 1A (subject image pick-up optical system) when the imaging lens unit 1A is mounted on the camera body 80. Since the color separating prism 81 includes a first prism 82, a second prism 83, and a third prism 84, light incident on the color separating prism 81 is separated into a red component, a green component, and a blue component. The first subject image pick-up CCD 85, the second subject image pick-up CCD 86 and the third subject image pick-up CCD 87 are disposed at a position facing the light-emitting surface of the first prism 82, a position facing the light-emitting surface of the second prism 83, and a position facing the light-emitting surface of the third prism 84, respectively.

In addition, the imaging lens unit 1A is provided with an AF relay lens (AF relay lens group) 10 of which an optical axis [AF (autofocus) optical axis] O2 is positioned on a part (a light component having specific deflection) of light reflected from the center of the polarizing prism 6 (light branching optical system, light branching unit). A total reflection mirror 11 (light branching optical system, optical path changer) is provided in the rear of the AF relay lens 10. Even if the polarizing prism 6 is not used, it is sufficient if light is branched.

The total reflection mirror 11 totally reflects incident light to the front side (the left side in FIG. 1) on which a subject is present. A tri-directional splitting prism 12 (tri-directional light branching unit), which splits incident light in three directions, is provided on the side to which the total reflection mirror 11 totally reflects incident light. The tri-directional splitting prism 12 includes three prisms 13, 14 and 15. A first optical-path-length-difference AF image pick-up element 21 (first image pick-up element), which is used for optical-path-length-difference AF, is fixed to the upper side of the tri-directional splitting prism 12. A second optical-path-length-difference AF image pick-up element 22 (second image pick-up element), which is used for optical-path-length-difference AF, is fixed to the left side (front side) of the tri-directional splitting prism 12. The first optical-path-length-difference AF image pick-up element 21 and the second optical-path-length-difference AF image pick-up element 22 are disposed at positions that have different optical path lengths on an optical path of a bundle of rays incident on the subject image pick-up optical system. In addition, a phase-difference AF optical system 30, which extends in a direction perpendicular to the plane of FIG. 1, is fixed to the side surface of the tri-directional splitting prism 12.

A bundle of rays, which is incident on the imaging lens unit 1A, is transmitted through the focus lens 2, the zoom lens 3, the diaphragm 4, the front relay lens 5, the polarizing prism 6, and the rear relay lens 7 and is led to the camera body 80. The bundle of rays is separated into a red light component, a green light component, and a blue light component at the color separating prism 81 included in the camera body 80; and a subject optical image is formed on each of the first subject image pick-up CCD 85, the second subject image pick-up CCD 86, and the third subject image pick-up CCD 87. Image signals, which represent subject optical images of the red light component, the green light component, and the blue light component, are output from the first subject image pick-up CCD 85, the second subject image pick-up CCD 86, and the third subject image pick-up CCD 87, respectively.

A part of the bundle of rays, which is incident on the imaging lens unit 1A, is reflected by the polarizing prism 6. The bundle of rays, which is reflected by the polarizing prism 6, is led to the total reflection mirror 11.

The bundle of rays, which is incident on the total reflection mirror 11, is totally reflected and is incident on the tri-directional splitting prism 12.

Figure 2:
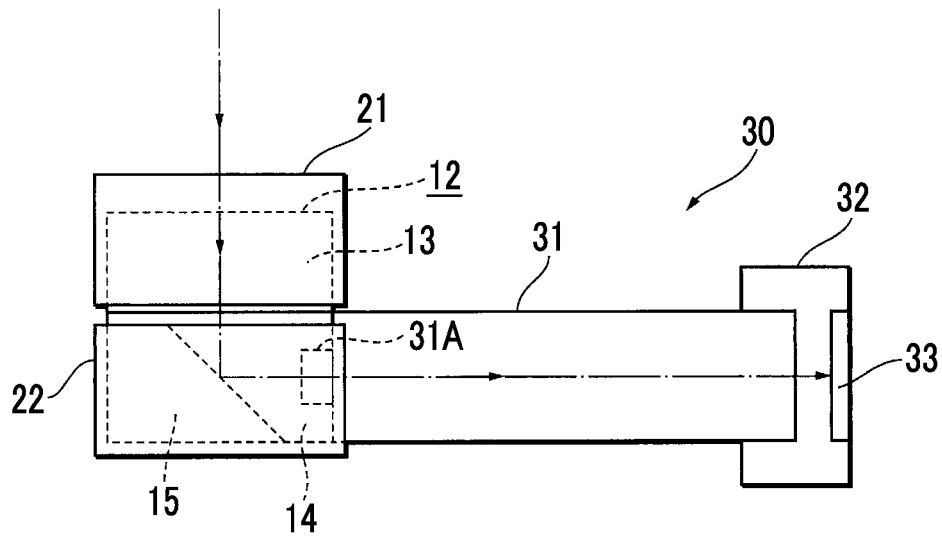
FIG. 2 is a front view of a tri-directional splitting prism.
Figure 3:
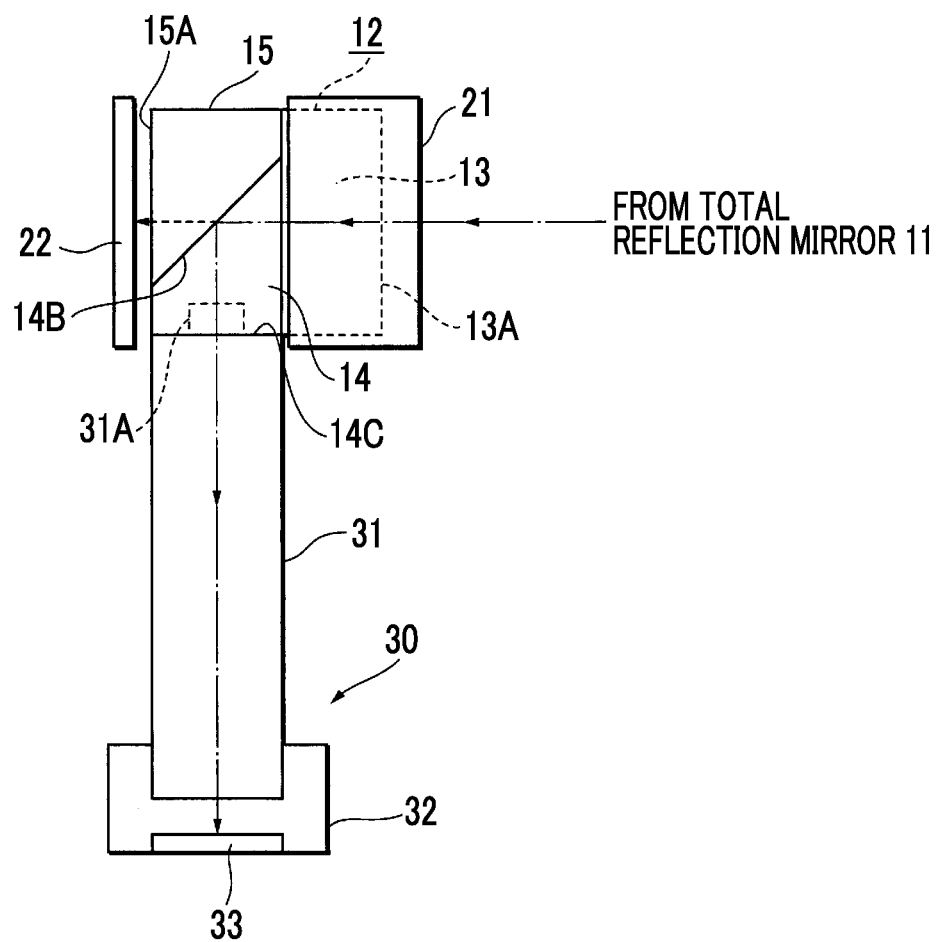
FIG. 3 is a plan view of the tri-directional splitting prism.

FIG. 2 is a front view of the tri-directional splitting prism 12 (a view seen from the front), and FIG. 3 is a plan view of the tri-directional splitting prism 12.

The tri-directional splitting prism 12 includes a first prism 13, a second prism 14, and a third prism 15. The bundle of rays, which is incident on the tri-directional splitting prism 12, is incident on a first flat surface 13A of the first prism 13 so as to be perpendicular to the first flat surface 13A, and a part of the bundle of rays is reflected by a second flat surface 13B. The reflected bundle of rays is reflected by the first flat surface 13A, is emitted from a third flat surface 13C, and is incident on the first optical-path-length-difference AF image pick-up element 21. Further, the bundle of rays, which is transmitted through second flat surface 13B of the first prism 13, is incident on a first flat surface 14A of the second prism 14. A part of the bundle of rays is reflected by a second flat surface 14B of the second prism 14, is emitted from a third flat surface 14C, which is a side surface of the second prism 14, and is incident on the phase-difference AF optical system 30.

The phase-difference AF optical system 30 includes a phase-difference image pick-up element unit 32 that holds a circular tube-shaped lens holding barrel 31 (pupil-splitting optical element) and a phase-difference image pick-up element 33. The lens holding barrel 31 includes separator lenses (not shown) that pupil-split an incident bundle of rays and form an image on the light-receiving surface of the phase-difference image pick-up element 33. A bundle of rays, which is incident on the lens holding barrel 31, is pupil-split by the separator lenses, and is led to the phase-difference image pick-up element 33. Phase-difference AF is performed on the basis of a signal that is output from the phase-difference image pick-up element 33.

A bundle of rays, which is transmitted through the second prism 14, is emitted from a light-emitting flat surface 15A of the third prism 15, and is incident on the second optical-path-length-difference image pick-up element 22.

The first optical-path-length-difference image pick-up element 21 and the second optical-path-length-difference image pick-up element 22 are positioned at positions that are separated forward and rearward from the positions of the light-receiving surfaces of the subject image pick-up CCDs 85, 86, and 87 included in the camera body 80 by optically equal distances. Accordingly, optical-path-length-difference AF is performed using signals that are output from the first optical-path-length-difference image pick-up element 21 and the second optical-path-length-difference image pick-up element 22.

Figure 4:
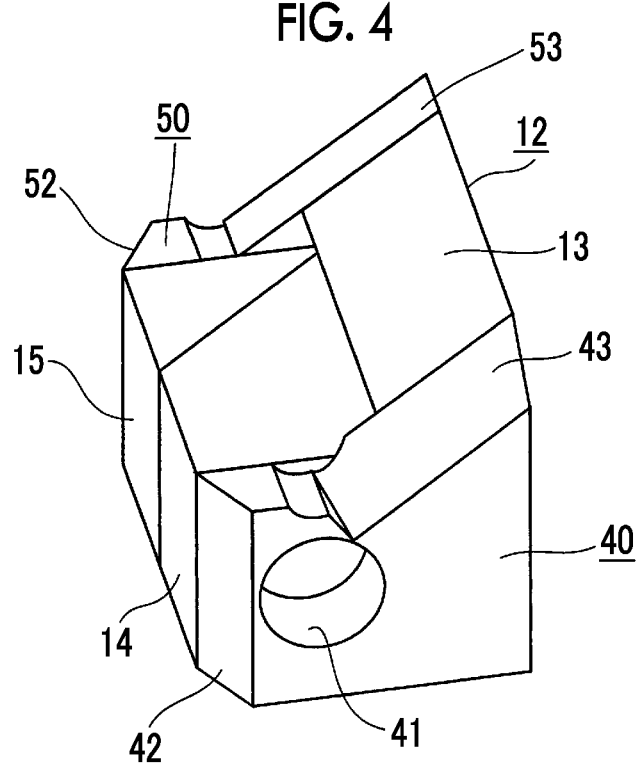
FIG. 4 is a perspective view of the tri-directional splitting prism.
Figure 5:
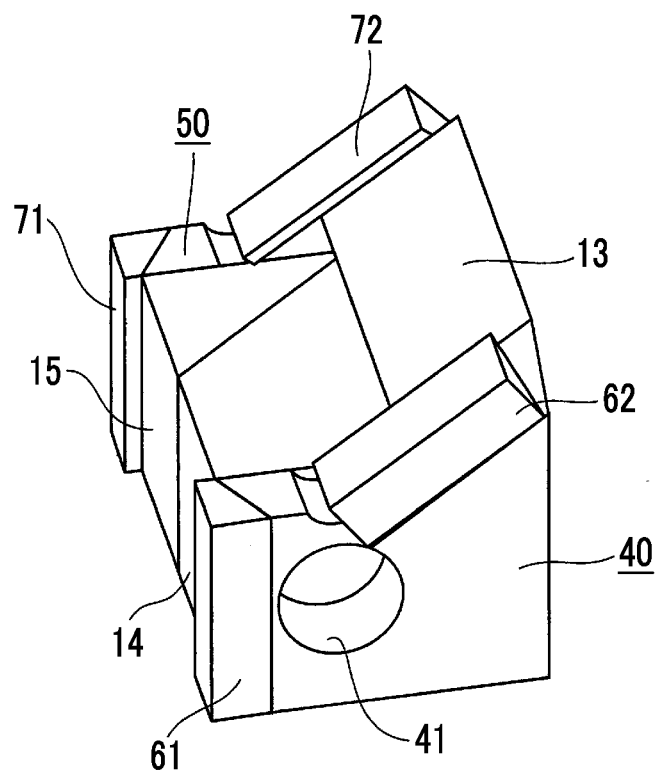
FIG. 5 is a perspective view of the tri-directional splitting prism.
Figure 6:
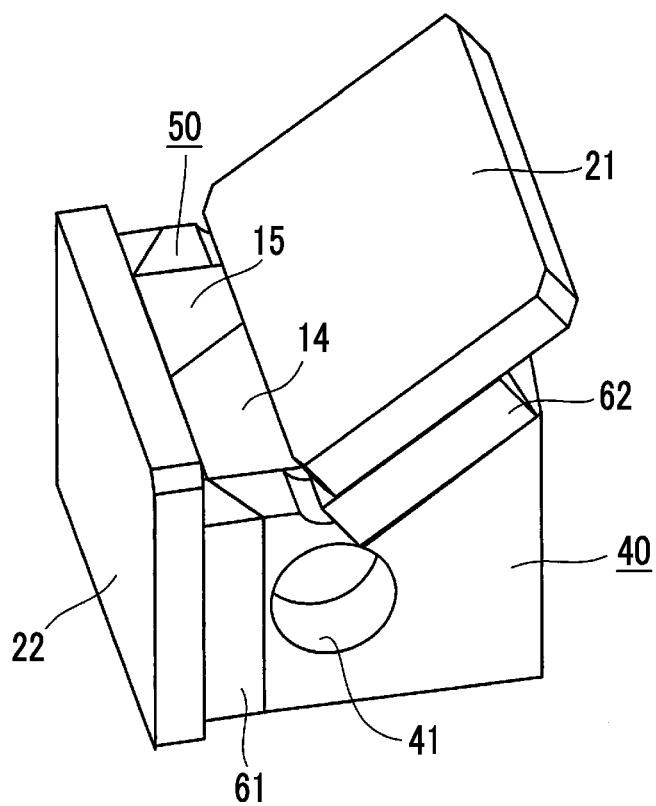
FIG. 6 is a perspective view of the tri-directional splitting prism.

FIGS. 4 to 6 are perspective views of the tri-directional splitting prism 12.

Referring to FIG. 4, the tri-directional splitting prism 12 includes the first prism 13, the second prism 14, and the third prism 15. As described above, light incident on the tri-directional splitting prism 12 is split in three directions by the prisms 13 to 15, and is incident on the first optical-path-length-difference image pick-up element 21, the second optical-path-length-difference image pick-up element 22, and the phase-difference image pick-up element 33.

Prism holding frames 40 and 50, which are made of ceramic or the like and have a substantially trapezoidal shape, are fixed to both side surfaces of the tri-directional splitting prism 12. Since a hole 41 is formed in one prism holding frame 40, the second prism 14 is exposed to the outside. A protruding portion 31A, which is formed at an end portion of the lens holding barrel 31 of the phase-difference AF optical system 30, is fitted to the hole 41.

Referring to FIG. 5, a wedged glass 61 is fixed to a front surface (left side) 42 of the prism holding frame 40 and a wedged glass 62 is fixed to the upper surface of the prism holding frame 40. Likewise, a wedged glass 71 is fixed to a front surface 52 of the prism holding frame 50 and a wedged glass 72 is fixed to the upper surface of the prism holding frame 50.

Referring to FIG. 6, the first optical-path-length-difference AF image pick-up element 21 is fixed to the wedged glasses 62 and 72 so that the light-receiving surface of the first optical-path-length-difference AF image pick-up element 21 faces the tri-directional splitting prism 12. Further, the second optical-path-length-difference AF image pick-up element 22 is fixed to the wedged glasses 61 and 71 so that the light-receiving surface of the second optical-path-length-difference AF image pick-up element 22 faces the tri-directional splitting prism 12.

Figure 7:
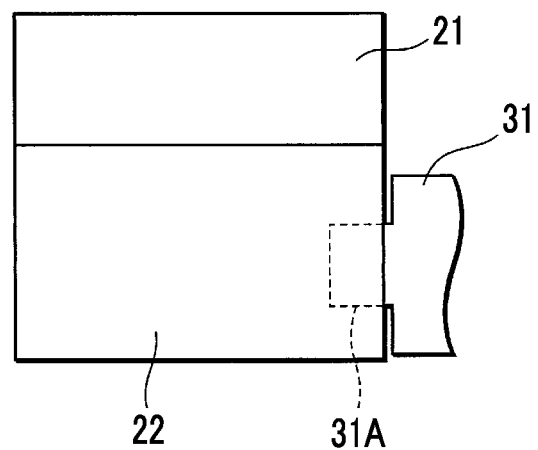
FIG. 7 is a front view of the tri-directional splitting prism.

FIG. 7 is a front view of the tri-directional splitting prism 12 to which the first optical-path-length-difference AF image pick-up element 21 and the second optical-path-length-difference AF image pick-up element 22 are fixed.

As described above, the protruding portion 31A, which is formed at the end portion of the lens holding barrel 31 of the phase-difference AF optical system 30, is fitted to the hole 41 formed in the prism holding frame 40.

As described above, light incident on the tri-directional splitting prism 12 is split in three directions and is incident on the first optical-path-length-difference image pick-up element 21, the second optical-path-length-difference image pick-up element 22, and the phase-difference image pick-up element 33.

Figure 8:
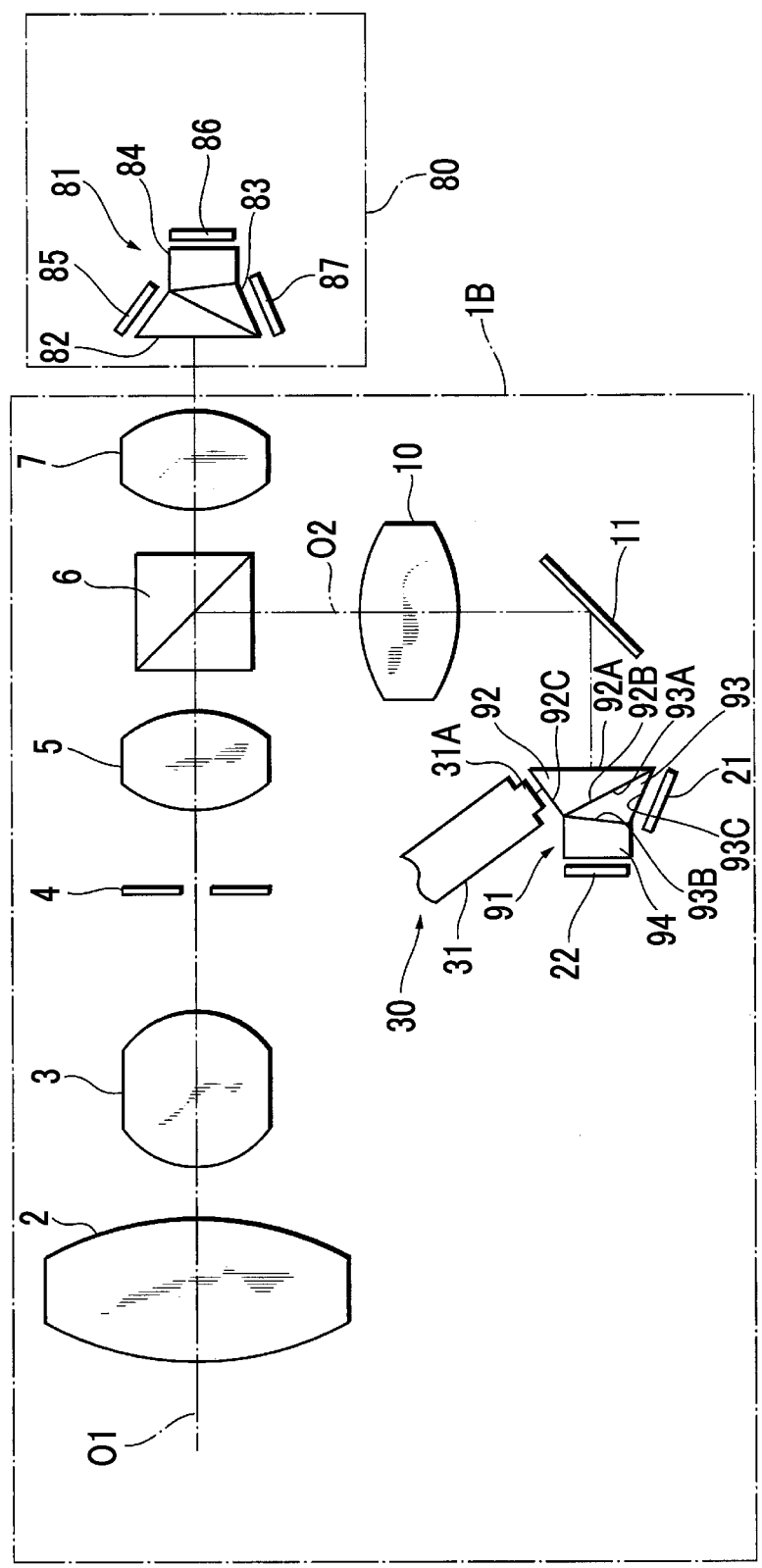
FIG. 8 shows the structure of an imaging lens unit.

FIG. 8 is a view corresponding to FIG. 1, and shows the optical structure of an imaging lens unit 1B and a part of the camera body 80. In FIG. 8, the same components as the components shown in FIG. 1 will be denoted by the same reference numerals and the description thereof will be omitted.

As described above, a bundle of rays reflected by a total reflection mirror 11 is incident on a tri-directional splitting prism 91. The tri-directional splitting prism 91 includes a first prism 92, a second prism 93, and a third prism 94. The tri-directional splitting prism 91 can utilize the structure of a three-color separating prism that separates an incident bundle of rays into three colors.

A bundle of rays is incident on a first flat surface 92A of the first prism 92, and a part of the bundle of rays is reflected by a second flat surface 92B of the first prism 92. The reflected light is reflected by the first flat surface 92A, and is emitted upward from a third flat surface 92C. A phase-difference AF optical system 30 is disposed at a position facing the third flat surface 92C of the first prism 92. A part of the light incident on the tri-directional splitting prism 91 is incident on a phase-difference image pick-up element 33 included in the phase-difference AF optical system 30. A bundle of rays, which is transmitted through the second flat surface 92B of the first prism 92, is incident on the second prism 93 from a first flat surface 93A. A part of the incident bundle of rays is reflected by a second flat surface 93B and the first flat surface 93A, and is emitted downward from a third flat surface 93C. A first optical-path-length-difference image pick-up element 21 is disposed at a position facing the third flat surface 93C of the second prism 93. Further, a bundle of rays, which is transmitted through the second flat surface 93B of the second prism 93, is transmitted through the third prism 94, and is incident on a second optical-path-length-difference image pick-up element 22.

When the phase-difference AF optical system 30 is disposed so that a bundle of rays, which is emitted from the upper portion of the tri-directional splitting prism 91, of the bundle of rays, which is split in three directions by the tri-directional splitting prism 91 as described above, is incident on the phase-difference AF optical system 30, the first optical-path-length-difference image pick-up element 21, the second optical-path-length-difference image pick-up element 22, the phase-difference AF optical system 30, the total reflection mirror 11, and the tri-directional splitting prism 91 should be lowered not so as to interfere with the subject image pick-up optical system since the phase-difference AF optical system 30 is long. For this reason, the size of the imaging lens unit 1B is increased.

Figure 9:
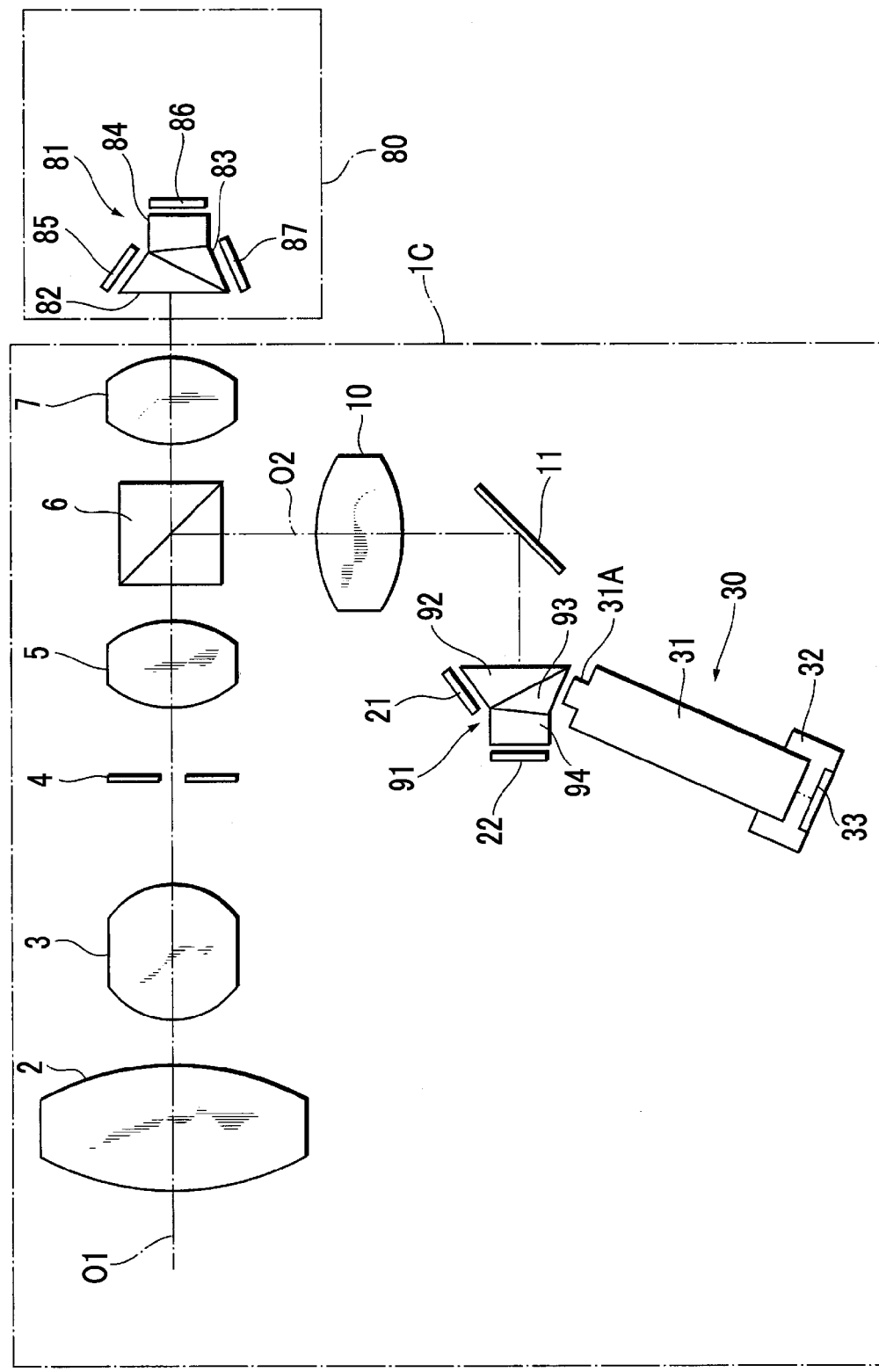
FIG. 9 shows the structure of an imaging lens unit.

FIG. 9 is a view corresponding to FIGS. 1 and 8, and shows the optical structure of an imaging lens unit 1C and a part of the camera body 80. In FIG. 9, the same components as the components shown in FIG. 1 or 8 will be denoted by the same reference numerals and the description thereof will be omitted.

A bundle of rays reflected by a total reflection mirror 11 is incident on a tri-directional splitting prism 91. The incident bundle of rays is split in three directions, and is incident on the first prism 92, the second prism 93, and the third prism 94 as shown in FIG. 8. A bundle of rays, which is emitted upward from the first prism 92, is incident on a first optical-path-length-difference image pick-up element 21. A bundle of rays, which is emitted downward from the second prism 93, is incident on a phase-difference AF optical system 30. A bundle of rays, which is emitted forward from the third prism 94, is incident on a second optical-path-length-difference image pick-up element 22.

Since the bundle of rays emitted downward from the tri-directional splitting prism 91 is incident on the phase-difference AF optical system 30, the phase-difference AF optical system 30 extends downward. For this reason, the size of the imaging lens unit 1C is increased.

FIGS. 10 to 15 show still another embodiment.

Figure 10:
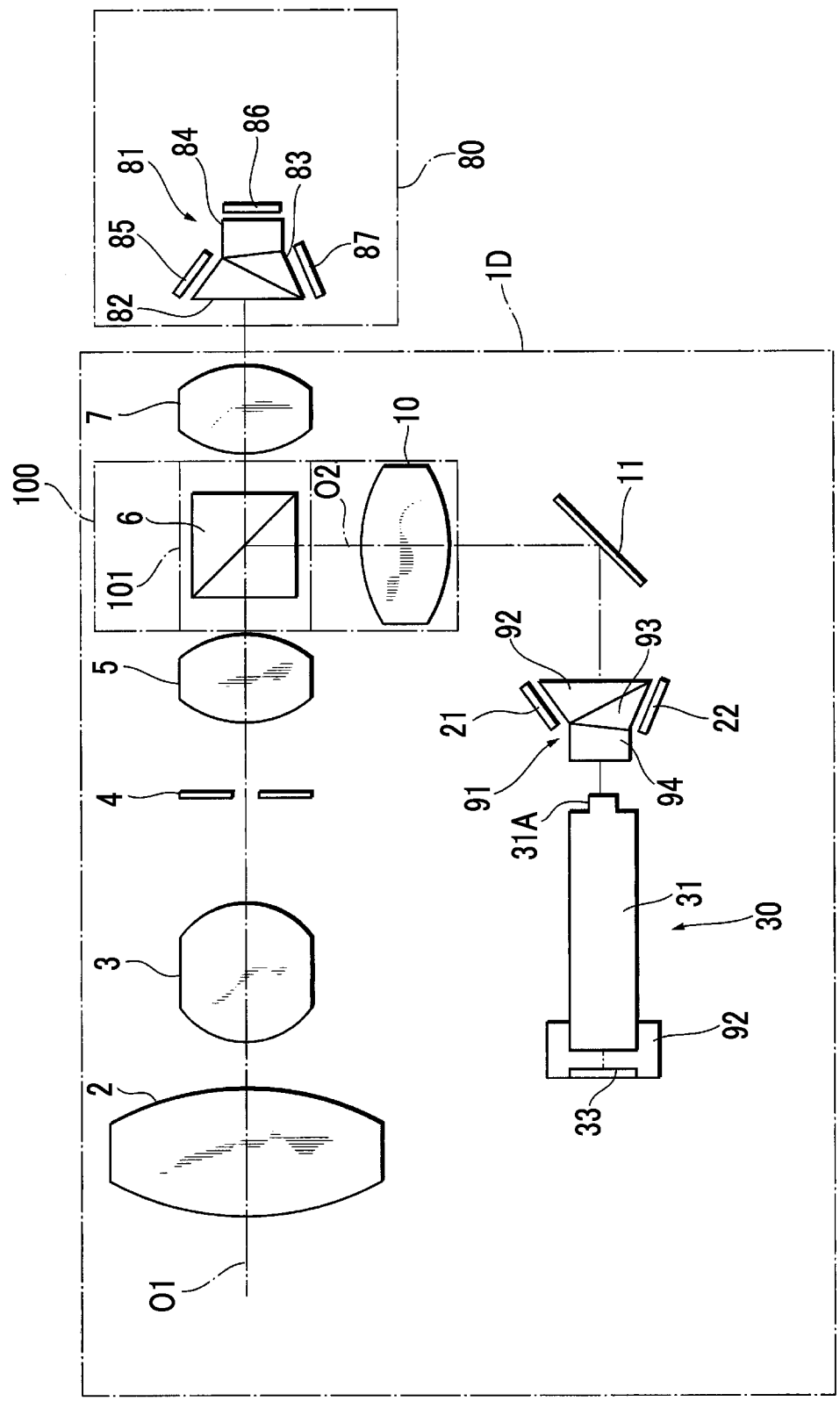
FIG. 10 shows the structure of an imaging lens unit.

FIG. 10 is a view corresponding to FIG. 1, and shows the optical structure of an imaging lens unit 1D and a part of the camera body 80. In FIG. 10, the same components as the components shown in FIG. 1, 8, or 9 will be denoted by the same reference numerals and the description thereof will be omitted.

A bundle of rays reflected forward by a total reflection mirror 11 is incident on a tri-directional splitting prism 91. The incident bundle of rays is split in three directions, and is incident on the first prism 92, the second prism 93, and the third prism 94 as shown in FIG. 8 or 9. A bundle of rays, which is emitted upward from the first prism 92, is incident on a first optical-path-length-difference image pick-up element 21. A bundle of rays, which is emitted downward from the second prism 93, is incident on a second optical-path-length-difference image pick-up element 22. A bundle of rays, which is emitted forward from the third prism 94, is incident on a phase-difference AF optical system 30.

In the embodiment shown in FIG. 10, an optical axis of the phase-difference AF optical system 30 is parallel to an optical axis 01 of the subject image pick-up optical system. For this reason, it is possible to prevent the imaging lens unit 1D from increasing in size even though the phase-difference AF optical system 30 is long.

In the embodiment shown in FIG. 10 (also in another embodiment), the angle of the total reflection mirror 11 is determined so that a bundle of rays led to the total reflection mirror 11 is reflected forward. However, the angle of the total reflection mirror 11 may be determined so that a bundle of rays led to the total reflection mirror 11 is not reflected forward and is reflected rearward. In this case, a tri-directional splitting prism 91, a first optical-path-length-difference image pick-up element 21, a second optical-path-length-difference image pick-up element 22, and a phase-difference AF optical system 30 are disposed to the rear of the total reflection mirror 11 with the same positional relationship as the positional relationship shown in FIG. 10. A bundle of rays, which is reflected rearward by the total reflection mirror 11, is incident on the tri-directional splitting prism 91, and is incident on the first optical-path-length-difference image pick-up element 21, the second optical-path-length-difference image pick-up element 22, and the phase-difference AF optical system 30 in the same manner as described above. Also in this case, the diameter of the imaging lens unit 1D can be reduced.

Further, in the embodiment shown in FIG. 10 (also in another embodiment), a part of the bundle of rays is deflected downward by a polarizing prism 6. However, a part of the bundle of rays may not be deflected downward and may be deflected upward. In this case, the total reflection mirror 11, the tri-directional splitting prism 91, the first optical-path-length-difference image pick-up element 21, the second optical-path-length-difference image pick-up element 22, and the phase-difference AF optical system 30 are disposed above the subject image pick-up optical system. Furthermore, as described above, the tri-directional splitting prism 91, the first optical-path-length-difference image pick-up element 21, the second optical-path-length-difference image pick-up element 22, and the phase-difference AF optical system 30 may be disposed in front of or in the rear of the total reflection mirror 11. It goes without saying that the optical axis of the phase-difference AF optical system 30 is parallel to the optical axis 01 of the subject image pick-up optical system even when the phase-difference AF optical system 30 is disposed above the subject image pick-up optical system.

In addition, the polarizing prism 6 and an AF relay lens 10 are held by a holder 100.

Figure 11:
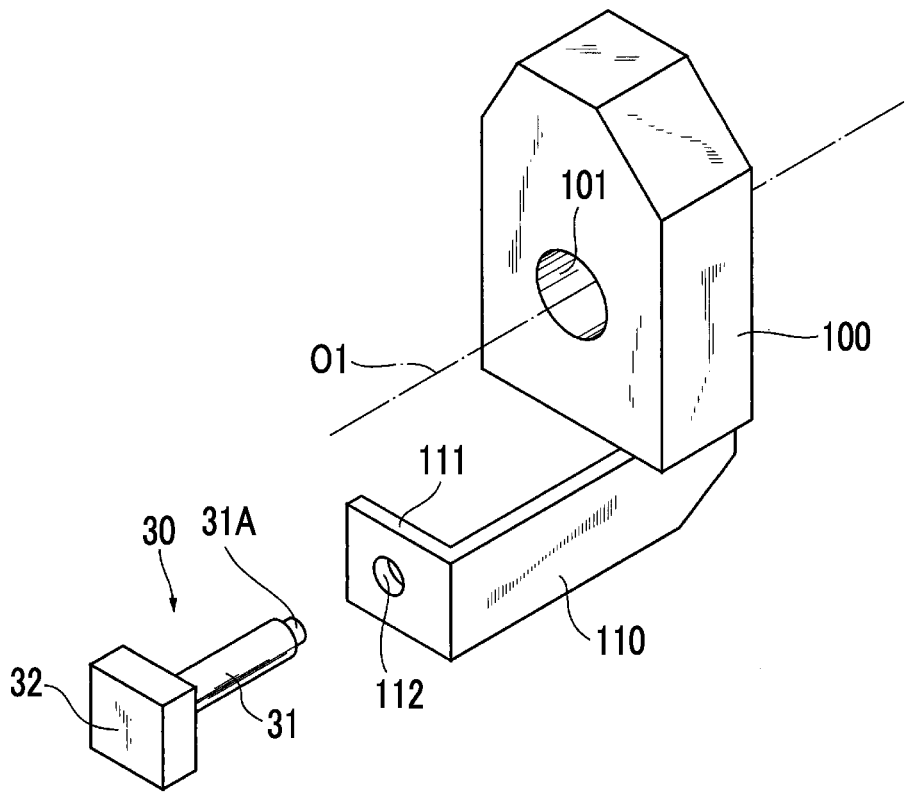
FIG. 11 is a perspective view of a phase-difference AF optical system that is mounted on a mounting member.
Figure 12:
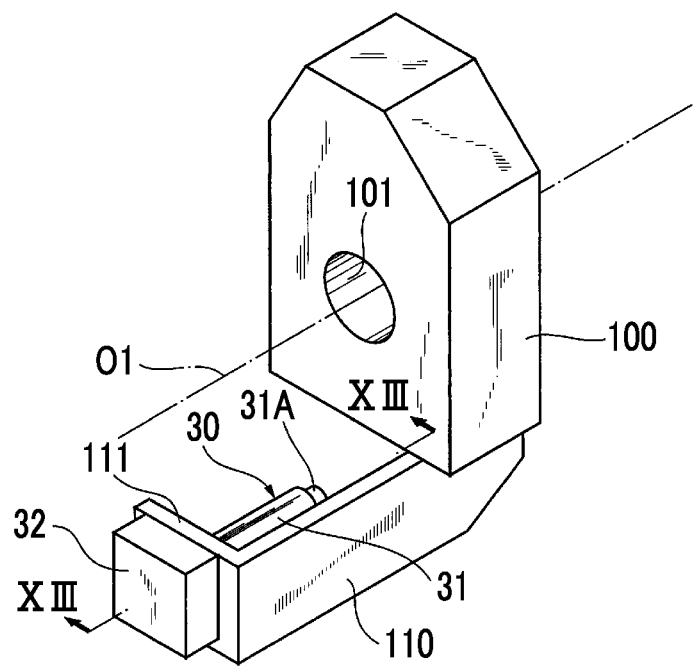
FIG. 12 is a perspective view of the phase-difference AF optical system that is mounted on the mounting member.

FIGS. 11 and 12 are perspective views of the holder 100.

The holder 100 has a substantially rectangular parallelepiped shape, and a hole 101 is formed at the center of the holder. The polarizing prism 6 is positioned in the hole 101 so that the optical axis O1 of the subject image pick-up optical system passes through the center of the polarizing prism 6 and a part of the bundle of rays incident on the polarizing prism 6 is deflected vertically downward.

A plate-like support 110, which extends forward, is fixed to a lower end portion of the holder 100 on the right side when seen from the front. A plate-like mounting member 111, which is bent inward so as to be perpendicular to the support 110, is fixed to the front surface of the support 110 (see FIG. 11). A hole 112 is formed at the center of the mounting member 111. A lens holding barrel 31 of the phase-difference AF optical system 30 is inserted into the hole 112. The phase-difference AF optical system 30 is mounted on the mounting member 111 so that the surface of a phase-difference image pick-up element unit 32 on which the lens holding barrel 31 is mounted comes into contact with the front surface of the mounting member 111 (see FIG. 12).

Figure 13:
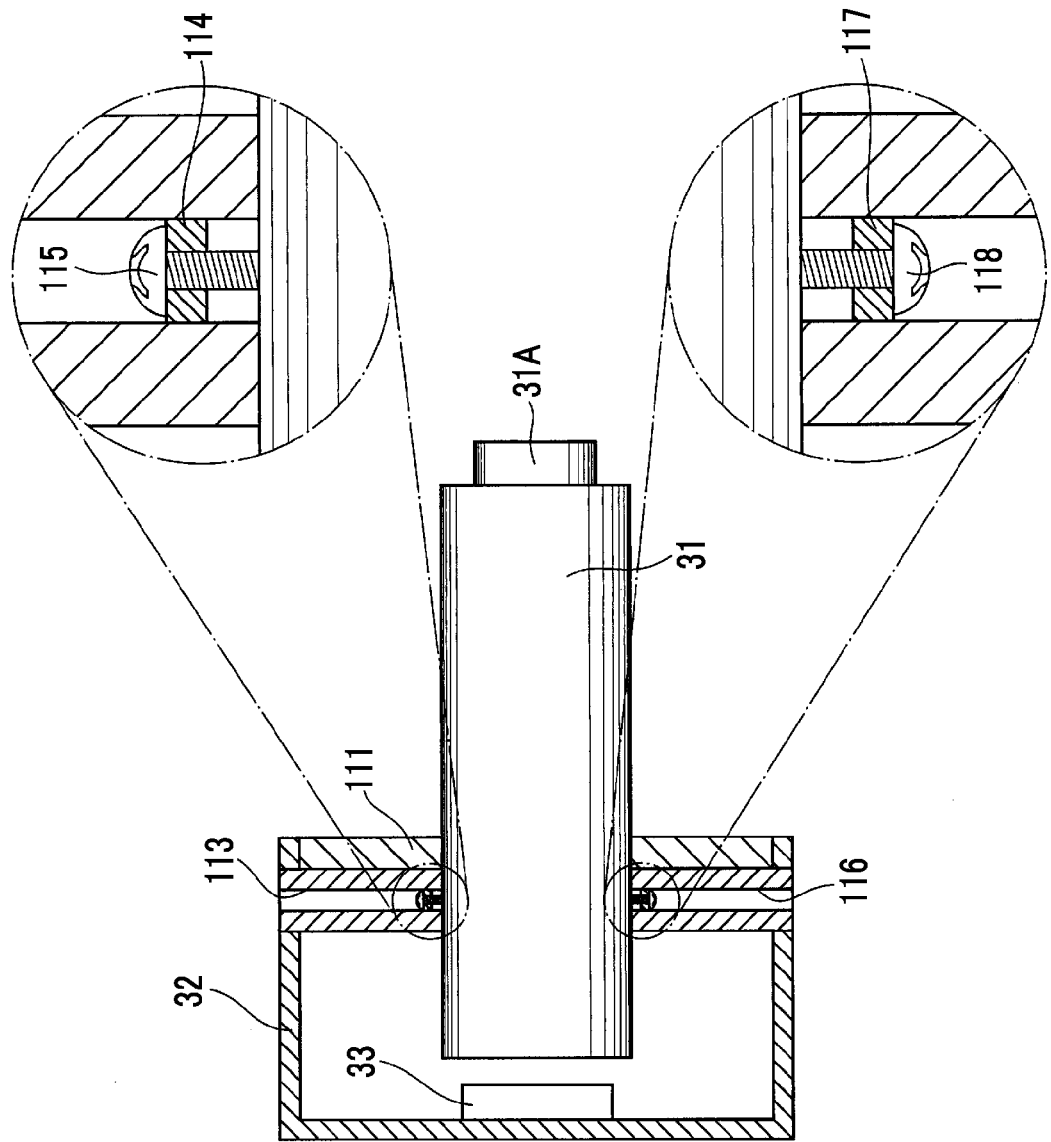
FIG. 13 is a sectional view taken along line XIII-XIII of FIG. 12.

FIG. 13 is a sectional view taken along line XIII-XIII of FIG. 12. The support 110 is not shown in FIG. 13.

The lens holding barrel 31 is fixed to the phase-difference image pick-up element unit 32. The lens holding barrel 31 is inserted into the hole 112 of the mounting member 111 as described above. An insertion hole 113, which communicates with the hole 112 from above, and an insertion hole 116, which communicates with the hole 112 from below, are formed in the mounting member 111. A screwing member 114 where screw grooves are formed is formed at a portion of the insertion hole 113 near the hole 112. A screw 115 is engaged with the screw grooves of the screwing member 114. Likewise, a screwing member 117 where screw grooves are formed is formed at a portion of the insertion hole 116 near the hole 112. A screw 118 is engaged with the screw grooves of the screwing member 117.

When the screws 115 and 118 are tightened, ends of the screws 115 and 118 enter the hole 112. The lens holding barrel 31 is fixed by the screws 115 and 118. When the screws 115 and 118 are loosened, these screws 115 and 118 are moved back from the hole 112. When the lens holding barrel 31 is released from the fixing using the screws 115 and 118, the lens holding barrel 31 is rotatable by a predetermined angle.

Figure 14:
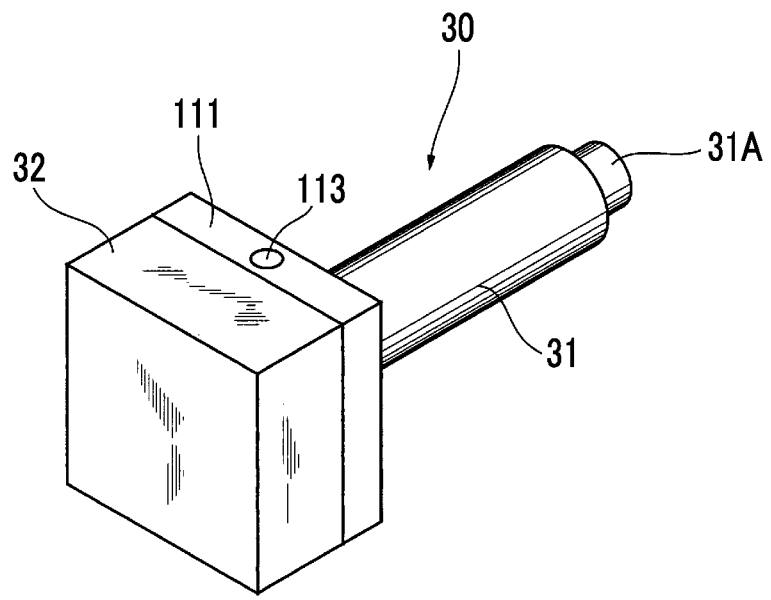
FIG. 14 is a perspective view of the phase-difference AF optical system.
Figure 15:
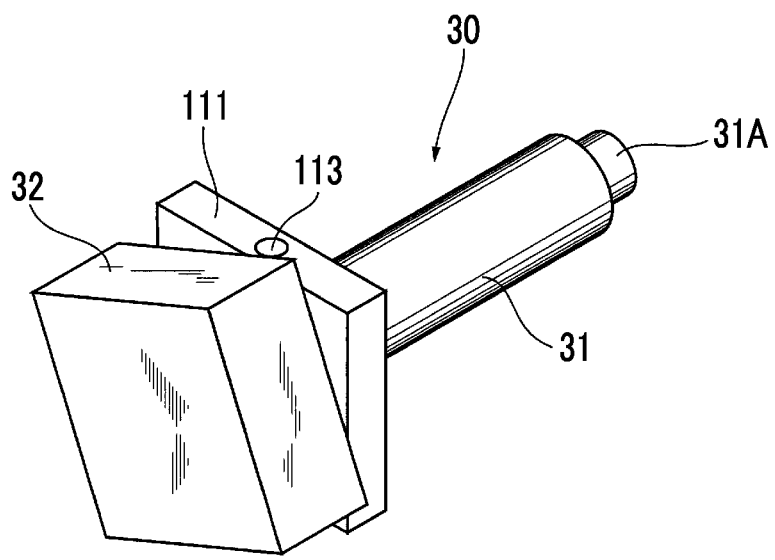
FIG. 15 is a perspective view of the phase-difference AF optical system.

FIGS. 14 and 15 are perspective views of the phase-difference AF optical system 30 that is mounted on the mounting member 111.

As shown in FIG. 13, the phase-difference AF optical system 30 can be fixed to or removed from the mounting member 111 by the adjustment of the screws 115 and 118.

The phase-difference AF optical system 30 can be mounted on the mounting member 111 so that the phase-difference image pick-up element unit 32 and the mounting member 111 are horizontal as shown in FIG. 14. The phase-difference AF optical system 30 can also be mounted on the mounting member 111 so that the positions of the phase-difference image pick-up element unit 32 and the mounting member 111 are inclined as shown in FIG. 15.

Figure 16:
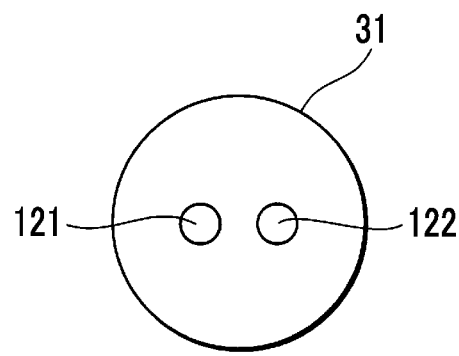
FIG. 16 shows separator lenses.
Figure 17:
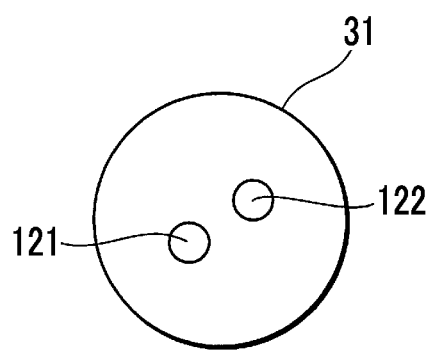
FIG. 17 shows separator lenses.

FIGS. 16 and 17 are views showing the aspects of an inner portion of the lens holding barrel 31 that is seen from the rear side (the left side in FIG. 13) of the lens holding barrel 31.

FIG. 16 is a view showing the aspect of separator lenses 121 and 122 provided in the lens holding barrel 31 in a state shown in FIG. 14, and FIG. 17 is a view showing the aspect of separator lenses 121 and 122 provided in the lens holding barrel 31 in a state shown in FIG. 15.

When the phase-difference AF optical system 30 is mounted on the mounting member 111 so that the phase-difference image pick-up element unit 32 and the mounting member 111 are horizontal as shown in FIG. 14, the separator lenses 121 and 122 provided in the lens holding barrel 31 are disposed at the same horizontal positions as shown in FIG. 16. In contrast, when the phase-difference AF optical system 30 is mounted on the mounting member 111 so that the positions of the phase-difference image pick-up element unit 32 and the mounting member 111 are inclined as shown in FIG. 15, the separator lenses 121 and 122 provided in the lens holding barrel 31 are inclined as shown in FIG. 17.

In phase-difference AF, autofocus is performed on the basis of the positions of two subject optical images separated by the separator lenses 121 and 122. Accordingly, when the separator lenses 121 and 122 are disposed at the same horizontal positions as shown in FIG. 16, it is difficult to find a difference between the positions of the two subject optical images in a vertical direction. For this reason, accurate autofocus cannot be performed. In contrast, since the two subject optical images are inclined when the separator lenses 121 and 122 are inclined as shown in FIG. 17, it is easy to find a difference between the positions of the two subject optical images in both a horizontal direction and a vertical direction. Accordingly, relatively accurate autofocus can be performed.

In the above-mentioned embodiments, for example, the transmittance of the polarizing prism 6 is 80% and the reflectance of the polarizing prism 6 is 20%. Further, the tri-directional splitting prism 12 or 91 is designed so that substantially the same light is incident on the first optical-path-length-difference image pick-up element 21, the second optical-path-length-difference image pick-up element 22, and the phase-difference image pick-up element 33.

Figure 18:
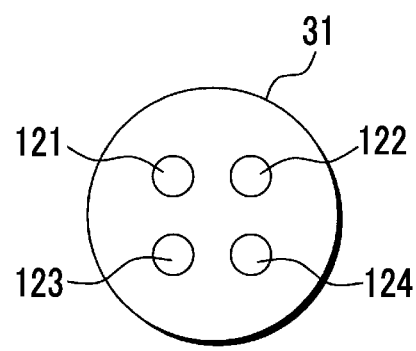
FIG. 18 shows separator lenses.

Furthermore, as shown in FIG. 18, separator lenses 121 to 124 provided in the lens holding barrel 31 may be arranged in a 2-by-2 form (a plurality of separator lenses may be arranged in a horizontal direction and a vertical direction). It can be understood that a phase difference can be detected in a horizontal direction and a vertical direction as described above when the separator lenses 121 to 124 are arranged in this manner.

What is claimed is:

1. A lens device comprising:
   a subject image pick-up optical system that allows a bundle of rays, which represents subject optical images, to form images on a light-receiving surface of a subject image pick-up element;
   a phase-difference AF optical system that includes a phase-difference image pick-up element in which a plurality of subject optical images, which are obtained when an incident bundle of rays having an optical axis parallel to an optical axis of said subject image pick-up optical system is split into a plurality of light components by pupil splitting, are formed on a light-receiving surface of the phase-difference image pick-up element;
   an optical-path-length-difference AF optical system that includes a first image pick-up element and a second image pick-up element having different optical path lengths; and
   a light branching optical system that leads a part of a bundle of rays, which is led to the subject image pick-up element by said subject image pick-up optical system, to said phase-difference AF optical system and said optical-path-length-difference AF optical system;
   wherein said phase-difference AF optical system comprising a phase-difference image pick-up element unit holding the phase-difference image pick-up element; and
   a lens holding barrel, which is fixed to the phase-difference image pick-up element, including a separator lens that pupil-splits an incident bundle of rays and forms an image on the light-receiving surface of the phase-difference image pick-up element;
   said lens device further comprising:
   a holder at which a hole through an optical axis of said subject image pick-up optical system is formed;
   a support which extends forward from said holder; and
   a mounting member which is bent so as to be perpendicular to said support, at which a hole is formed, and which is fixed to the front of said support;
   wherein said lens holding barrel is inserted in the hole formed at said mounting member rotably.

2. The lens device according to claim 1,
   wherein said phase-difference AF optical system is disposed below the subject image pick-up optical system.

3. The lens device according to claim 1,
   wherein said light branching optical system includes
      a light branching unit that branches a part of the bundle of rays, which is led to the subject image pick-up sensor by said subject image pick-up optical system, in a vertical direction, and
      an optical path changer that branches the bundle of rays, which is branched by said light branching unit, to the front of the lens device,
   the optical-path-length-difference AF optical system includes a tri-directional light branching unit that transmits a part of the bundle of rays, which is led to the front of the lens device by the optical path changer, and branches the bundle of rays in two directions different from a direction toward the front of the lens device, and leads two pencils of light, which are branched in two directions different from the direction toward the front of the lens device by the tri-directional light branching unit, to the first image pick-up element and the second image pick-up element, and the bundle of rays, which is transmitted through the tri-directional light branching unit, is incident on said phase-difference AF optical system.

4. The lens device according to claim 1, wherein the separator lens including a plurality of separator lenses arranged in a horizontal direction and a vertical direction.

* * * * *